United States Patent [19]

Miller

[11] Patent Number: 4,581,267
[45] Date of Patent: Apr. 8, 1986

[54] MOISTURE AND OXYGEN BARRIER LAMINATE FOR PHOTOGRAPHIC OR PRINTED ARTICLES

[75] Inventor: James A. Miller, Stow, Ohio

[73] Assignee: Morgan Adhesives Company, Stow, Ohio

[21] Appl. No.: 665,365

[22] Filed: Oct. 26, 1984

Related U.S. Application Data

[63] Continuation-in-part of Ser. No. 426,192, Sep. 9, 1982, abandoned.

[51] Int. Cl.$^4$ .......................... C09J 7/02; G03C 3/00
[52] U.S. Cl. .................................. 428/40; 428/202; 428/207; 428/343; 428/352; 428/355; 428/483; 428/518; 430/18
[58] Field of Search ................. 428/40, 202, 204, 207, 428/913, 343, 352, 518, 483, 355; 430/18

[56] References Cited

U.S. PATENT DOCUMENTS

| | | | |
|---|---|---|---|
| 2,758,035 | 8/1956 | Matthes | 428/202 |
| 3,494,818 | 2/1970 | Marchese | 428/202 X |
| 4,158,587 | 6/1979 | Keller et al. | 428/202 X |
| 4,330,604 | 5/1982 | Wreede et al. | 430/18 X |
| 4,378,392 | 3/1983 | Segel | 428/40 |
| 4,381,329 | 4/1983 | Dallmann et al. | 428/404 |

OTHER PUBLICATIONS

Segel, abandoned application Ser. No. 471,320, filed Jun. 8, 1981.

*Primary Examiner*—Thomas J. Herbert
*Attorney, Agent, or Firm*—Oldham, Oldham & Weber Co.

[57] ABSTRACT

A moisture and oxygen barrier laminate which can be applied to a surface of photographic or printed material. The laminate also has an adhesive layer containing ultraviolet light absorbers therein. In the one embodiment, the laminate is transparent, thus allowing continuous display of a photographic or printed material. In another embodiment, the multilayer device is opaque, thus completely blocking the transmission of both ultraviolet and visible light to the photographic film or print. In the latter embodiment, the multi-layer device is removed for display of the photographic print or film and subsequently reattached during storage.

19 Claims, 2 Drawing Figures

# MOISTURE AND OXYGEN BARRIER LAMINATE FOR PHOTOGRAPHIC OR PRINTED ARTICLES

CROSS-REFERENCE

This application is a continuation-in-part of my prior application bearing U.S. Ser. No. 426,192, filed Sept. 9, 1982 abandoned.

TECHNICAL FIELD

The invention herein lies in the art of a protection laminate for photographic prints and printed articles. More particularly, the laminate described protects an article from the harmful effects of ultraviolet light, moisture and oxygen. The invention is applicable to any size of photographic or printed materials and is secured thereon by means of an adhesive.

BACKGROUND ART

Heretofore, the art of photographic protection has included devices purporting to protect the photographic material from the harmful effects of ultraviolett light. Some of these devices consisted of an ultraviolet barrier as in the form of a layer secured to the photograph by an adhesive. To the applicant's knowledge, however, there are no devices in the prior art which utilized ultraviolet light absorbers in an acrylic adhesive and also protected the material from moisture and oxygen. The effects of ultraviolet light on the photographic and printed materials is well known. Such effects include the fading of bright colors in color film such that a washed-out appearance is produced. By moisture, it is not exclusively meant liquid water, for normal humidity in the air can produce a marked effect upon photographic material over a period of time, often resulting in severe damage to the material. However, oxygen will oxidize the print or film, etc., and cause it to degrade as evidenced by a color change or fading of the image. There are conventional materials available which are known to have very low moisture vapor transmission rates and oxygen permeability. These materials have been used with great success in the food industry to keep perishable foods fresh. There are however no known applications of such materials in the field of photographic preservation, or printed matter preservation.

Thus, none of the above relate to providing a ready access for viewing of the photograph print or film, or printed matter, and which will, at the same time, protect the article or print from the effects of ultraviolet light, moisture and oxygen.

DISCLOSURE OF INVENTION

In light of the foregoing, it is an aspect of the instant invention to provide a laminate for preventing moisture vapor and oxygen from contacting photographic or printed material and affect the preservation of said material thereby.

It is another aspect of the instant invention to provide a moisture and oxygen barrier laminate for photographic or printed material, as above, which at the same time is also protected from the effects of ultraviolet light.

It is still another aspect of the instant invention to provide a moisture and oxygen barrier laminate for photographic or printed material, as above, which allows photographic or printed material to be displayed out of doors without being subject to the effects of the weather.

A still further aspect of the instant invention is to provide a moisture and oxygen barrier laminate for photographic or printed material, as above, having an opaque cover whereby both ultraviolet light and visible light may be excluded completely from impinging upon the surface of the photographic or printed material yet said cover is easily removed for inspection of the material.

It is yet a further aspect of the instant invention to provide a moisture and oxygen barrier laminate for photographic or printed material, as above, wherein said laminate contains an ultraviolet light absorbant layer.

It is yet another aspect of the instant invention to provide a moisture and oxygen barrier laminate for photographic or printed material, as above, wherein said laminate contains a moisture and oxygen resistant layer.

It is yet a further aspect of the instant invention to provide a moisture and oxygen barrier laminate for photographic or printed material, as above, wherein said moisture and oxygen resistant layer is fluorohydrocarbon plastic.

The foregoing and other aspects of the invention, which will become more apparent as the detailed description proceeds, are achieved by: a moisture and oxygen barrier laminate for photographic or printed material, comprising: a cover layer coated with a polyvinylidene chloride and an adhesive capable of adhering to photographic or printed material, said adhesive being adhered to said polyvinylidene chloride.

BRIEF DESCRIPTION OF DRAWINGS

For a better understanding of the invention, reference is made to the following detailed description and accompanying drawings wherein.

BEST MODE FOR CARRYING OUT THE INVENTION

Figure 1:
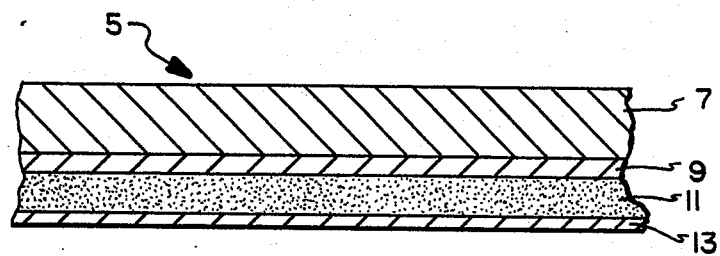
FIG. 1 is a cross-sectional view of a laminate of the present invention as it appears prior to application upon the photographic material.

With reference to FIG. 1, it is seen that a multi-layer device according to the teachings of the instant invention is designated generally by the number 5. A moisture and oxygen barrier layer 9 is sandwiched between an optional cover layer 7 and an adhesive layer 11. Desirably, 11 is a pressure sensitive adhesive. Prior to application, release liner 13 is removed from the adhesive 11 and the laminate applied to any photographic film or printed material.

Figure 2:
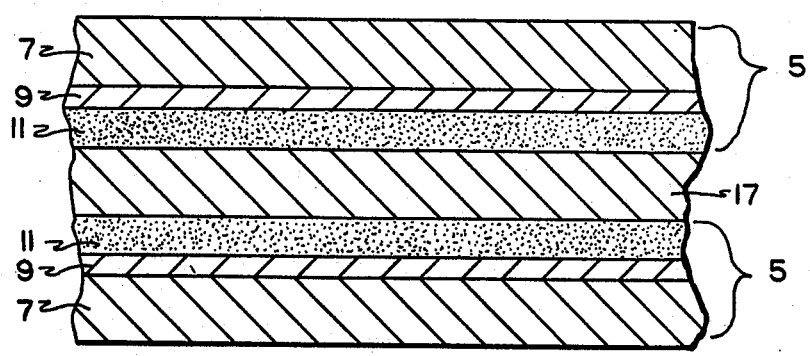
FIG. 2 is a cross-sectional view of a photographic film wherein the laminate has been applied to both sides of the photographic material.

FIG. 2 shows laminate 5 in use. It is noted that a multi-layer device 5 is preferably affixed to either side of the photographic film or printed matter 17, although it can be applied to only one side. When the multi-layer device is used to protect a photographic print, printed matter with suitable backing, etc., only one surface is usually covered with the device; that is, that one side on which the image is located.

The cover layer 7 provides dimensional stability to the multi-layer device 5 providing a flexible, tear-resistant surface for the laminate 5. In addition to providing dimensional stability, the cover layer 7 protects the underlying layers from dirt, scratches, and other damage resulting from normal handling of the photographic or printed material or from exposure of the material in the out-of-doors. The cover layer can also contribute a desired surface of the print, e.g., glossy, matte, or semi-matte.

In one embodiment of the invention, cover layer 7, along with the underlying layers of the laminate is clear, that is, transparent. Thus, the photographic image may be displayed yet is unobstructed by the moisture and oxygen-resistant laminate 5.

The cover layer 7 can be constructed of any conventional plastics such as polypropylene, polyester, polycarbonate, polyacrylate, polyurethane, polyvinyl chloride, copolymers of polyvinyl chloride, or the like. Desirably, the covering layer is a flexible material. The thickness of cover layer 7 may vary from about ½ to about 10 mils, with from about 2 to about 5 mils being preferred. Desirably, cover layer 7 has good ultraviolet light resistance.

In another embodiment of the invention (not shown), an opaque layer can be added over cover layer 7, or the opaque layer can be cover layer 7. The opaque layer can be made from an opaque material or have carbon black or other non-transparent materials contained therein. Examples of opaque material include plastic, cloth, metal, leather, paper, and the like. Naturally, the opaque layer blocks out both visible and ultraviolet light. Such complete blocking of light may be necessary and desirable in those instances where the photographic material is especially fragile and/or sensitive to all wavelengths of light. Such items or articles can include photographs of very early vintage in which exposure to light must be kept to a minimum. In this embodiment, the laminate is temporarily removed to display the image and then may be reattached for storage of the photographic material. Desirably, the adhesive for this embodiment must be cleanly removable so that no residue remains on the photographic material. An example of such an adhesive is low peel strength acrylic adhesive which is well known to those skilled in the art.

The moisture and oxygen barrier layer 9 can be affixed to the support film 7 in the form of either a coating or a film, depending upon the type of material used in construction of the moisture barrier layer 9. The selection of material of construction of the moisture and oxygen barrier layer 9 is governed by the oxygen permeability and moisture vapor transmission rate of the material under consideration. In general, it is noted that halogenated polymeric materials provide the greatest barrier to moisture vapor and oxygen transmission.

An example of a halogenated polymeric material which provides excellent resistance to moisture vapor and oxygen transmission is the ACLAR type film manufactured by Allied Corporation. These films are fluorohalocarbon polymers. In particular, a coating of poly(vinylidene chloride) that is, PVDC, provides an excellent barrier to moisture vapor and oxygen. PVDC can also be applied to the cover layer 7 as a coating or series of coatings. Other but less desirable halogenated hydrocarbon polymers include, fluoronated ethylene-propylene, high density polyethylene, a copolymer of vinylidene chloride, for example "Saran" manufactured by Dow Chemical, "DARAN," manufactured by W. R. Grace, polyvinyl fluoride, polychlorotrifluoroethylene, polymers, and the like. The moisture barrier is applied to cover layer 7 to provide a laminate. The moisture and oxygen barrier layer may range in thickness of between about ¼ to about 5 mils, with about ¾ to about 1¼ mils being preferred. Cover layer 7 can be coated, printed, etc., on barrier layer 9, or vice versa. Alternatively, any conventional pressure sensitive adhesive or other conventional or common adhesive layer can be used to join cover layer 7 to barrier layer 9 (not shown). The thickness of the adhesive layer can range from about 0.1 to about 5 mils. As previously indicated, PVDC can also be applied to the cover layer 7 such as polyethylene terephthalate as a coating or series of coatings. Thus, these polyvinylidene chloride-coated polyesters can be coated with a layer of adhesive to give an excellent moisture and oxygen barrier laminate to protect photographic or printed material.

The moisture and oxygen barrier layers described above desirably have permeabilities to moisture of less than 3.0 grams/100 sq. in./24 hrs., desirably below 0.1 g./100 sq. in./24 hrs., and preferably below 0.06 g./100 sq. in./24 hrs. These permeabilities are measured by the techniques described in ASTM E-96. The oxygen permeability of the barrier layer should be less than 20 cc/100 in.$^2$/24 hrs./atmosphere at 25° C., desirably less than 15, and preferably less than 12 cc/100 in.$^2$/24 hrs./atmosphere at 25° C. as measured by ASTM D 1434.

The adhesive characteristics of the adhesive layer 11 vary according to which embodiment of the invention is being employed. In the embodiment in which the cover layer 7 is transparent, the multilayer device 5 is applied once to the photographic or printed material and could remain permanently in place through the use of a permanent adhesive. In this embodiment, conventional ultraviolet light-absorbing chemicals are conveniently added to the adhesive mixture prior to application of said adhesive mixture upon the moisture barrier layer. Such chemicals can be conventional ultraviolet light absorbers known to the art such as the various benzophenones and/or the various benzotriazoles. The amount of the ultraviolet absorbing agents generally constitutes a weight percent range of between about 2 and about 15 percent of solids with a preferred range of between about 4 and about 10 weight percent of solids based upon the total weight percent of the adhesive solids. Generally, if more than one ultraviolet-absorbing chemical is used, said chemicals are desirably mixed in equal weight proportion.

In the embodiment wherein the cover layer 7 is opaque, there is obviously no need for ultraviolet light inhibitors in the adhesive layer 11. On the other hand, the adhesive in the second embodiment must retain its releasable properties through repeated cycles of removal and reattachment of the laminate and thus a removable adhesive is utilized.

The adhesive 11 of the present invention is an acrylic type adhesive since such an adhesive will not discolor. Various acrylic adhesives are well known to the art and are utilized in the present invention as opposed to rubber-based adhesives since the latter will discolor. The ultraviolet absorbing agents are utilized in the adhesive to prevent it from being degraded by ultraviolet light and also to keep the photographic or printed material from being degraded or damaged. The acrylic adhesive containing the ultraviolet absorbing agents therein can be cast as a layer upon moisture and oxygen barrier layer 7. Moreover, conventional solvents can be used to cast the adhesive layer or films such as methyl ethyl ketone, butyl acetate, and the like. The thickness of the adhesive layer generally ranges from about 0.25 to about 4.0 mils, and preferably from about 1 to 2 mils.

During manufacture of the laminate, the last step of the process is usually the addition of a release layer 13 to adhesive layer 11. Release layer 13 protects the adhesive layer 11 during shipment and storage prior to application. When the laminate 5 is applied to the photographic material, release liner 13 is removed. The composition of the release layer 13 is of conventional materials such as silicone-coated paper, plastic, or the like.

The invention herein described is not necessarily limited to any type or size of photographic or printed material such as negatives or prints in its application. Also the present invention is particularly useful in out-of-doors applications where heretofore the use of actual photographs would be unfeasible yet highly desirable. For example, with this invention, it is possible to use an actual photographic print on a billboard and eliminate the costly procedure whereby billboard posters are manufactured. Likewise, this invention is amenable to use as a protective device for poster size or album size photographs. Because of the invention's highly desirable aging resistant properties, photographic material may be used in such novel applications as wall coverings, placemats, and the like. Although the preferred use is with regard to photographic materials, the invention can also be used on process prints, that is, color prints which are made by separately printing three different colors, e.g., yellow, magenta (red) and cyan (blue). The invention is also applicable to any printed matter wherein various dyes or pigments are used. Of course, in many of these novel applications, it is necessary to not only make the photographic material resistant to moisture vapor and oxygen penetration but also essentially waterproof to protect against liquid water. Thus, is is understood that these applications would require the use of appropriate materials to effect said waterproofing.

It is usually desirable, when protecting photographic film such as transparencies or other exposed items, to apply laminate 5 to both sides of the film as indicated in FIG. 2.

The invention will be better understood by the following example.

EXAMPLE

A colored photographic print was covered with the following structure: a 3 mil clear polyacrylic film was coated on one side with a polyvinylidene chloride layer and attached to the photograph with an acrylic pressure sensitive adhesive containing 4 parts by weight of an ultraviolet light absorber based on the total amounts of adhesive solids. The acrylic adhesive had the following formulation:

Durotak 80-1005: 250.0
Tinuvin 328: 1.5
Cyasorb UV-531: 1.5
Dilution Solvent: 40.0

Durotak 80-1005 is an acrylic multipolymer having pressure sensitive properties, made by National Starch and Chemical Co., Bridgewater, N.J.

Tinuvin 328 is a benzotriazole ultraviolet light absorber manufactured by Ciba-Geigy Corp., Ardsley, N.Y.

Cyasorb UV-531 is a benzophenone ultraviolet light absorber manufactured by American Cyanamid Co., Boundbrook, N.J.

The dilution solvent was ethyl acetate.

After 300 plus hours in an accelerated weathering device (Model XW Weatherometer by Atlas Electric Devices, Inc.), the photograph showed much less fade than did a photograph covered by a similar laminate minus the water vapor and oxygen barrier layer, that is the polyvinylidene chloride layer. Additionally, when compared to a photograph without any overlaminate at all, the fade was considerably less. Moreover, the protected photograph showed no noticeable effect of moisture or water vapor penetration or of oxygen penetration, as determined by color change.

It can thus be seen from the above example that the barrier layer effectively reduced any moisture and oxygen effect upon the photograph and that the formulated acrylic type adhesive effectively abated any fading caused by ultraviolet light.

From the foregoing, it is appreciated that the various aspects of the invention have been satisfied by the structure presented herein. While in accordance with the patent statutes only the best mode and preferred embodiments of the invention have been presented and described in detail, it is to be understood that the invention is not limited thereto or thereby. Accordingly, for an appreciation of the true scope and breadth of the invention, reference should be had to the appended claims.

What is claimed is:

1. A moisture and oxygen barrier laminate for photographic or printed material, comprising:
   at least a moisture and oxygen barrier, said layer having an oxygen permeability of 20 cc/100 in.$^2$/24 hrs./1/atm at 25° C. or less, and a moisture transmission of 3.0 grams/100 in.$^2$/24 hrs. or less, wherein said moisture and oxygen barrier layer is a halogenated polymer or a polymer of ethylene or ethylene-propylene; said halogenated polymer being either polyvinylidene chloride or a copolymer of vinylidene chloride;
   including an adhesive layer on said moisture and oxygen barrier layer, said adhesive layer having ultraviolet light absorbers therein;
   and including a release liner, said release liner being attached to said adhesive layer.

2. The laminate of claim 1 wherein said moisture and oxygen resistant layer is a polymer selected from the group consisting of, ethylene-propylene copolymer, and high density polyethylene.

3. The laminate of claim 1 wherein the adhesive is an acrylic adhesive or a silicone adhesive.

4. The laminate according to claim 1 wherein said moisture and oxygen layer has a cover layer attached to face opposite one containing adhesive layer thereon.

5. A moisture and oxygen barrier laminate according to claim 1 wherein said adhesive layer contains from about 2 to about 15 percent by weight of an ultraviolet light absorber.

6. The laminate of claim 5 wherein the ultraviolet absorber is selected from the group consisting of benzophenones, benzotriazoles, and combinations thereof.

7. The laminate of claim 1 wherein the moisture and oxygen resistant layer is polyvinylidene chloride.

8. The laminate according to claim 7, where a cover layer is adhered to a face of the moisture and oxygen layer opposite face having adhesive layer thereon.

9. A moisture and oxygen barrier laminate for photographic or printed material, comprising:
   a cover layer coated with a polyvinylidene chloride and an adhesive, capable of adhering to photographic or printed material, said adhesive being adhered to said polyvinylidene chloride.

10. The laminate of claim 9, wherein said cover layer is polypropylene.

11. The laminate of claim 9, wherein said cover layer is polyvinyl chloride.

12. The laminate of claim 9, wherein said cover layer is a polyester.

13. The laminate of claim 12, wherein the polyester is a polyethylene terephthalate.

14. A moisture and oxygen barrier laminate for photographic or printed material, comprising:

A polyacrylic film having one side coated with a polyvinylidene chloride layer and said layer having adhered thereto an adhesive capable of adhering to photographic or printed material.

15. A moisture and oxygen barrier laminate according to claim 14, wherein said adhesive layer contains from about 2 to about 15 percent by weight of solids of said ultraviolet light absorbers therein based upon the weight of solids in said adhesive.

16. The laminate of claim 14, wherein the adhesive is an acrylic adhesive or a silicone adhesive.

17. The laminate according to claim 14, wherein said adhesive layer contains ultraviolet light absorbers selected from the group consisting of benzophenones, benzotriazoles, and combinations thereof.

18. The laminate of claim 14, wherein the polyacrylic film of the laminate has its face not in contact with polyvinylidene chloride covered with a cover layer.

19. The laminate according to claim 18, wherein the cover layer is opaque.

* * * * *